July 1, 1930.  J. W. SMITH  1,768,798
TOOL HOLDER
Filed May 28, 1925  2 Sheets-Sheet 1
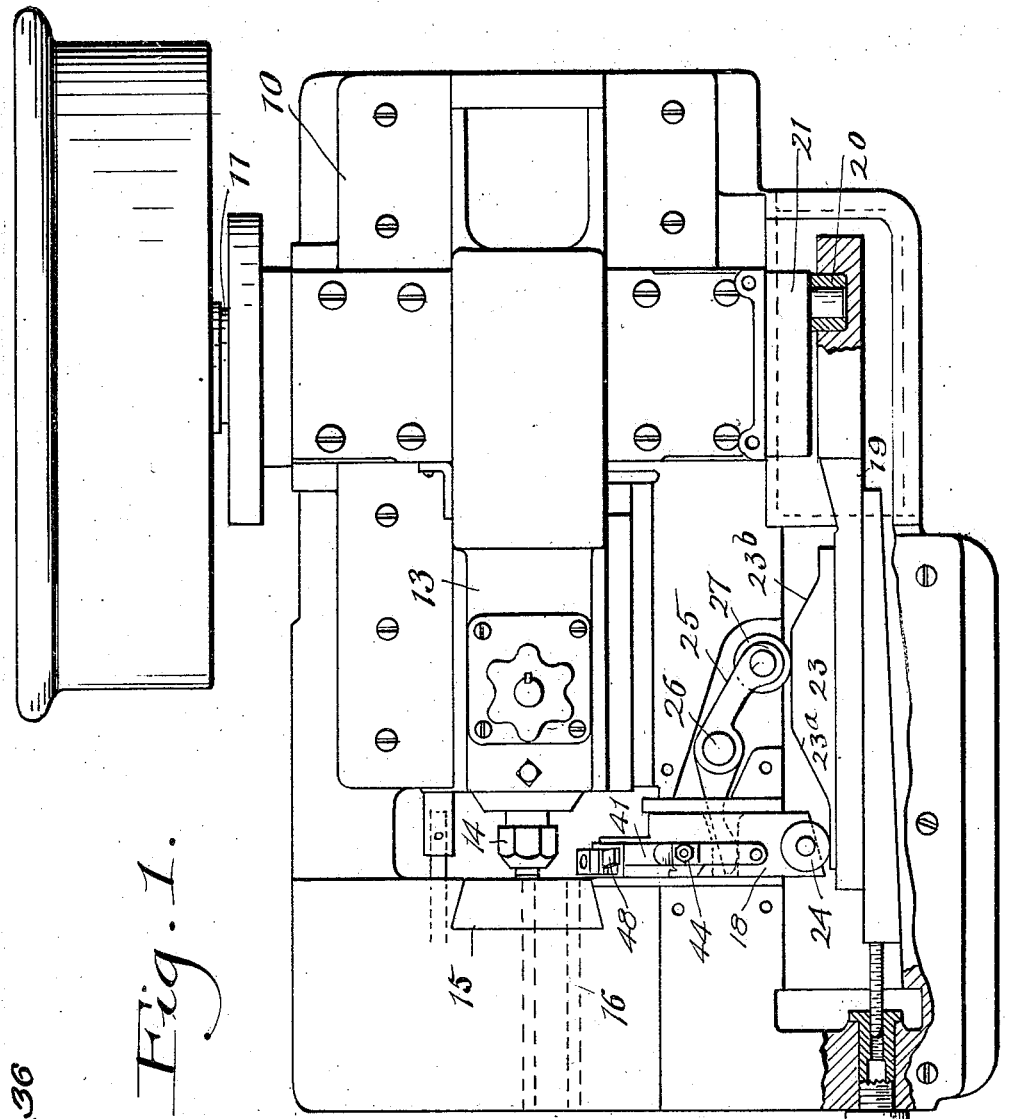

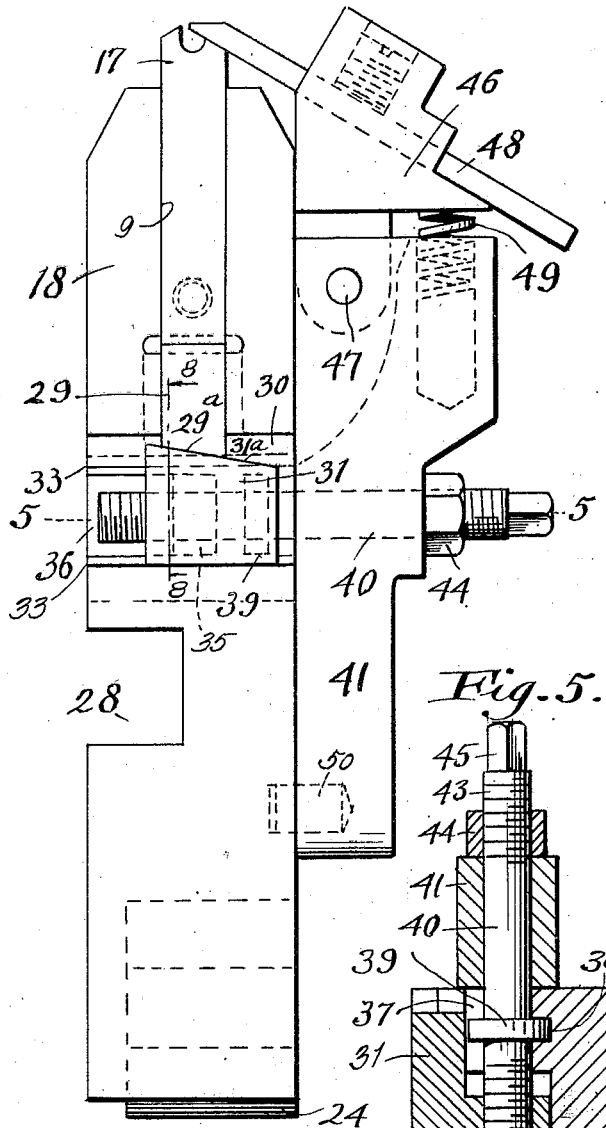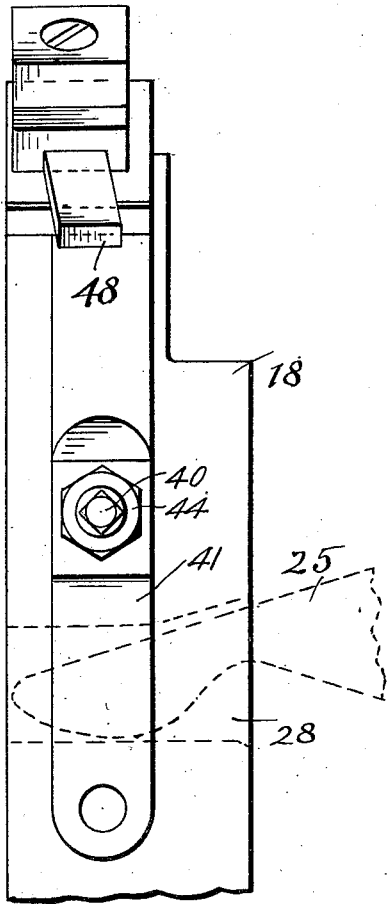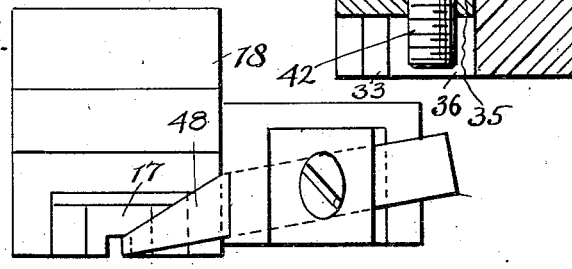

Patented July 1, 1930

1,768,798

UNITED STATES PATENT OFFICE

JAMES W. SMITH, OF BALTIMORE, MARYLAND, ASSIGNOR TO THE LAMSON & SESSIONS COMPANY, OF CLEVELAND, OHIO, A CORPORATION OF OHIO

TOOL HOLDER

Application filed May 28, 1925. Serial No. 33,367.

This invention relates to an adjustable tool holder for metal working machines which is shown herein as applied to a cutter slide. The invention has for its object to provide an adjustable thrust receiving member for holding a tool in adjusted position, the thrust receiving member being so mounted as to provide an unyielding abutment for the inner end of the tool and in such a manner that it can be quickly and easily moved to adjust the tool longitudinally to compensate for wear or to release the tool.

With the above and other objects in view, the invention may be said to comprise the device as illustrated in the accompanying drawings, hereinafter described, and particularly set forth in the appended claims together with such variations and modifications as will be apparent to one skilled in the art to which the invention appertains.

Reference should be had to the accompanying drawings forming a part of this specification in which Fig. 1 is a top plan view of a metal working machine having a cutter embodying the present invention; Fig. 2 is a front elevation of the cutter slide; Fig. 3 is a fragmentary top plan view showing the forward portion of the slide; Fig. 4 is an end view looking toward the outer end of the slide; Fig. 5 is a section on the line 5—5 of Fig. 2; Fig. 6 is a top plan view of the wedge block; Fig. 7 is a side elevation of the wedge block, and Fig. 8 is a sectional detail view on line 8—8 of Fig. 2, with the wedge block and thrust block removed.

Referring to the accompanying drawings, the numeral 10 designates the horizontal bed or frame of a machine such as used for forming rivet or bolt blanks, all that is essential in so far as the present invention is concerned being the cutter head for cutting stock which is fed into the machine in suitable lengths.

At the forward part of the machine there is a crank shaft 11 which reciprocates a movable slide or plunger guided in the frame and provided at its forward end with a tool 14 adapted to operate on the stock after the latter has been cut into the required lengths by the stock cutting mechanism. Forwardly of the tool 14 there is a die block 15 which is provided with an opening 16 through which the stock which is to be cut into sections is fed. The stock is cut by means of a reciprocating cutter 17 which moves across the face of the die block 15, this cutter being carried by a slide 18 movable in a guideway extending transversely of the machine. The slide 18 is reciprocated by means of a slide 19 suitably guided for reciprocating motion in the frame of the machine, the movement of the slide 19 being at right angles to that of the cutter slide 18. The slide 19 is reciprocated by a crank pin 20 carried by a crank disc 21 fixed to the end of the crank shaft 11. The slide 19 carries a double acting cam 23 having two oppositely inclined cam surfaces $23^a$ and $23^b$. The slide 18 is provided with a roller 24 which is engaged by the cam surface $23^a$ in the reciprocating of the slide 19 to move the cutter bar inwardly to cut off the stock. Slide 18 is retracted by means of a lever 25 pivoted between its ends on a pin 26 mounted in the bed frame 10. The rear end of this lever carries a roller 27 adapted to ride over the inclined surface $23^b$ of the cam and the forward end of the lever projects into an opening 28 in the slide 18. The rollers 24 and 27 are so arranged that one of them rides down one of the inclined surfaces of the cam 23 while the other is riding up the other inclined surface so that the slide 18 is positively actuated in both directions.

The cutter bar 17 is mounted within a channel 9 which is formed in the front face of the slide 18 and extends longitudinally thereof, the inner end of the cutter bar engaging a thrust block 29 which fits within the tool receiving channel 9 at the inner end thereof. The tool receiving channel 9 extends to a transverse channel 30 in which there is slidably mounted a wedge block 31 which forms an abutment for the inner end of the thrust block 29, the inner end of the thrust block 29 having an inclined face 29ª which engages an inclined face 31ª of the wedge block formed along an edge of the outer portion of the block which lies within the outer portion of the channel 30. The inner portion of the channel 30 is narrower than the outer portion thereof and the wedge block 31 is provided, inwardly of the wedge portion 31ª, with under-cut shoulders 32 which fit within grooves 33 formed in the walls of the channel 30. The block 31 is provided with a lug 35 which fits within a recess 36 in the forward portion of the channel 30. The rear portion of the channel has a narrower and shallower recess 37 which is provided with a groove 38 to receive a thrust flange 39 of a screw 40 which fits within the recess 37. The screw 40 passes through a stripper supporting block 41 and serves to secure the stripper supporting block 41 to the top of the slide 18. The screw 40 has opposite end portions 42 and 43 threaded, the lower threaded portion 42 engaging in the lug 35 of the wedge block, and the upper threaded portion receiving a nut 44 which serves to clamp the stripper block 41 in place and to lock the screw against rotation. In order to further assist in positioning and securing the block 41 in place, I also employ a dowel pin 50 which is set into one of these members and extends into a registering recess in the other. The screw 40 has a squared outer end 45 adapted to be engaged by a wrench to turn the screw. When it is desired to adjust the wedge block to shift the cutter outwardly or to release the cutter, the lock nut 44 is loosened and the screw 40 is turned until the block 31 is adjusted to the desired position, the screw being held against longitudinal movement by the thrust flange 39 engaging in the groove 38 of the slide. When the wedge block is adjusted to the desired position the screw may be locked against further rotation by tightening the lock nut 44. The block 41 forms a support for a holder 46 which is connected to the block by a transverse pivot 47 and carries an adjustable stripper bar 48, the outer end of which overlies the cutter, the holder 46 being yieldably held against pivotal movement by a spring 49 interposed between the holder 46 and the block 41.

Having thus described my invention, I claim:

1. An adjustable tool holder comprising a slide having a longitudinal tool receiving channel in its inner face at one end thereof and a transverse channel at the inner end of said first-mentioned channel, said transverse channel being deeper than said tool receiving channel and having its inner portion narrower than its outer portion, a wedge block slidably fitting in the wider outer portion of the transverse channel and having a lug projecting inwardly therefrom, said block having an inclined thrust receiving face on the side thereof toward the tool receiving channel, and an adjusting screw rotatably mounted in the slide and extending longitudinally within the transverse channel, said screw engaging the lug of the wedge block to adjust the same in its channel.

2. In a machine of the class described, a guide, a tool holder comprising a slide mounted to slide in said guide, said slide having a longitudinal recess adapted to receive a tool and support its against transverse movement, said slide also having a transverse recess intersecting said longitudinal recess, a wedge in said transverse recess adapted to transmit motion to said tool for adjustment thereof, a block adapted to support a work holding finger mounted upon one side of said slide, and an adjusting screw mounted in said block and having operative engagement with said wedge, whereby said screw performs the double function of adjusting the wedge and holding the block in place on the slide.

3. In a machine of the class described, a guide, a tool holder comprising a slide mounted to slide in said guide, said slide having a longitudinal recess adapted to receive a tool and support it against transverse movement, said slide also having a transverse recess intersecting said longitudinal recess, a wedge in said transverse recess adapted to transmit motion to said tool for adjustment thereof, a block adapted to support a work holding finger mounted upon one side of said slide, and an adjusting screw extending through an opening in said block and into an opening in said wedge and adapted to adjust the latter transversely, said screw being provided with a lock nut adapted to be threaded down into engagement with said block, whereby the block is held in position on the slide and the wedge is locked in a given position of adjustment.

4. In a machine of the class described, a horizontal guide, a tool holder comprising a slide mounted to move in said guide, said slide having a longitudinal recess adapted to receive a tool and support it against transverse movement, said slide also having a transverse recess intersecting said longitudinal recess, a wedge in said transverse recess adapted to transmit motion to said tool for adjustment thereof, a block adapted to support a work holding finger, said block being mounted upon one side of said slide and having a dowel connection with said slide, and an adjusting screw extending through an opening in said block and into an opening in said wedge, said screw being adapted to adjust the wedge transversely, said screw being provided with a lock nut adapted to be threaded down into engagement with said block, whereby the block is held in position on the slide and the wedge is locked in a given position of adjustment.

In testimony whereof, I hereunto affix my signature.

JAMES W. SMITH.